United States Patent
Kashina (10) Patent No.: US 7,263,235 B2
(45) Date of Patent: Aug. 28, 2007

(54) IMAGE PROCESSING METHOD AND APPARATUS, AND COMPUTER PRODUCT

(75) Inventor: Takako Kashina, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 10/457,553

(22) Filed: Jun. 10, 2003

(65) Prior Publication Data

US 2003/0228060 A1    Dec. 11, 2003

(30) Foreign Application Priority Data

Jun. 11, 2002    (JP) .............................. 2002-170433

(51) Int. Cl.
  *G06K 9/36*    (2006.01)
  *G06K 9/46*    (2006.01)
(52) U.S. Cl. ..................................... 382/240
(58) Field of Classification Search ................ 382/162, 382/164, 166, 173, 190, 232, 233, 240, 246, 382/251, 305; 345/537, 589, 600–604; 375/240.19, 375/240.26; 341/59, 67, 79
See application file for complete search history.

(56) References Cited

U.S. PATENT DOCUMENTS

| | | | |
|---|---|---|---|
| 7,016,546 B2 * | 3/2006 | Fukuhara et al. ........... | 382/239 |
| 7,076,104 B1 * | 7/2006 | Keith et al. ................. | 382/233 |
| 2001/0024530 A1 * | 9/2001 | Fukuhara et al. ........... | 382/240 |
| 2002/0027558 A1 | 3/2002 | Osa | |
| 2002/0048405 A1 * | 4/2002 | Zandi et al. ................. | 382/232 |
| 2002/0064232 A1 | 5/2002 | Fukuhara et al. | |
| 2003/0002734 A1 * | 1/2003 | Islam et al. ................. | 382/166 |
| 2003/0147560 A1 * | 8/2003 | Schwartz ..................... | 382/240 |
| 2003/0179942 A1 * | 9/2003 | Okada et al. ............... | 382/240 |

FOREIGN PATENT DOCUMENTS

| JP | 2001-358593 | 12/2001 |
|---|---|---|
| JP | 2002-165098 | 6/2002 |

\* cited by examiner

*Primary Examiner*—Amir Alavi
(74) *Attorney, Agent, or Firm*—Staas & Halsey LLP

(57) ABSTRACT

In an image processing apparatus, a pixel data processing section quantizes pieces of pixel data that represent individual pixels, and a pixel data storage section temporarily stores the quantized pixel data. A data monitoring section refers to the pixel data for a plurality of pixels stored in the pixel data storage section, and specifies a bit plane having the greatest bit plane number of bit planes that include at least one "1". An effective data select section feeds only pieces of bit data for bit planes whose bit plane numbers are equal to or smaller than the specified bit plane number of the respective pixels among the data in the pixel data storage section, to a bit plane data processing section. The bit plane data processing section codes only the data fed from the effective data select section.

14 Claims, 9 Drawing Sheets

PIXEL a → PIXEL b → PIXEL c → PIXEL d

FIG.9

IMAGE PROCESSING METHOD AND APPARATUS, AND COMPUTER PRODUCT

CROSS-REFERENCE TO RELATED APPLICATIONS

This application is based upon and claims the benefit of priority from the prior Japanese Patent Application No. 2002-170433, filed on Jun. 11, 2002, the entire contents of which are incorporated herein by reference.

BACKGROUND OF THE INVENTION

1) Field of the Invention

The present invention relates to a technology for coding bit data for individual bit planes that constitute an electronic image.

2) Description of the Related Art

Nowadays, large-scale integrated circuits (LSIs) are incorporated into every type of electronic appliances ranging from information equipment to cooking equipment. The performance of an LSI sometimes directly influences the value or price of a product into which the LSI is incorporated. It is an important technical object particularly for the LSI incorporated into a digital camera or the like to realize the acceleration of processing rate and the saving of power while processing is targeted to a large amount of image data.

The conventional art has, however, a disadvantage of wasting time and power because of originally unnecessary processings.

Figure 1A:
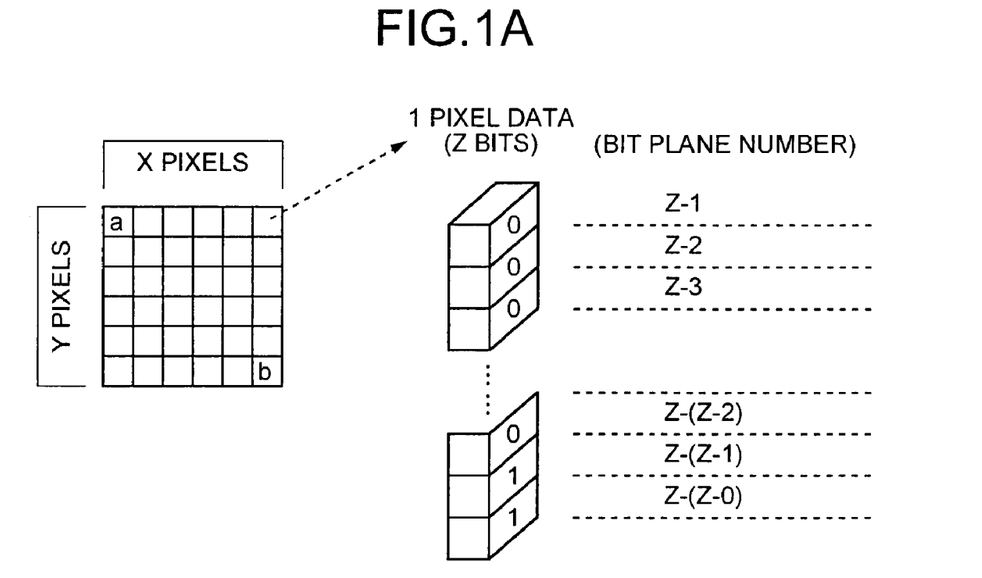
FIG. 1A and FIG. 1B schematically show a data structure of an electronic image.
Figure 1B:
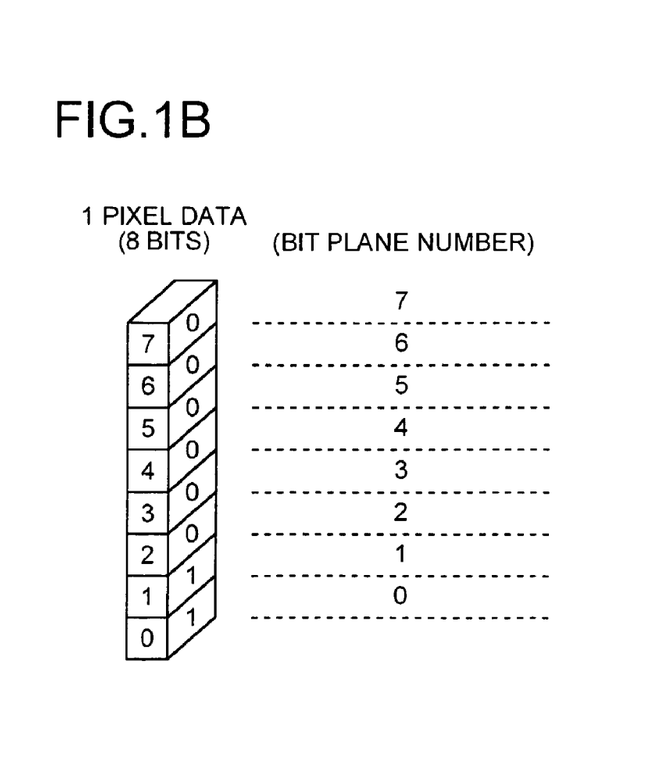

FIG. 1A and FIG. 1B schematically show a data structure of an electronic image to be processed by the LSI. As shown in FIG. 1A, each of pixels of the image that consists of horizontal X pixels and vertical Y pixels, is represented by Z pieces of bit data. A group of pieces of bit data for the individual pixels located at the same position (same digit) is referred to as "bit plane".

As shown in FIG. 1B, if Z is, for example, 8, then a group of the most significant bits (MSB) of the individual pixels is bit plane 7 (=8−1), and a group of the least significant bits (LSB) thereof is bit plane 0 (=8−(8−0)). Each bit data can be expressed by a combination of pixel name and bit plane number, for example, "a7".

Figure 2:
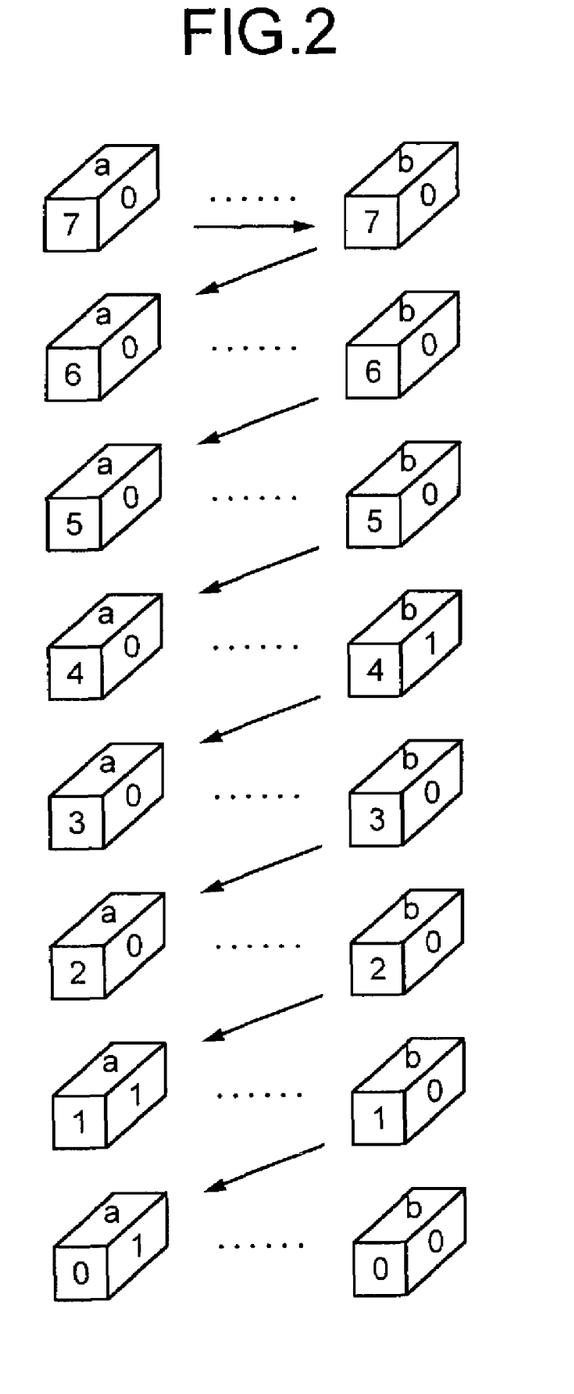
FIG. 2 shows a processing order of subjecting respective bit data to entropy coding according to the conventional art.

A circuit that subjects the image to image processing, e.g., entropy coding, for each bit plane processes as follows. As shown in FIG. 2, the circuit processes the data of the bit plane 7 of the individual pixels from a pixel "a" located in an upper left corner to a pixel "b" located in a lower right corner, processes the data of the bit plane 6 thereof from "a" to "b" in the same manner, and so on. Namely, the circuit successively processes a plurality of pieces of bit data having the same bit numbers as if the circuit crosses the pixels.

Depending on the type of coding, there is a case where it suffices to know only the bit plane number of a bit plane filled with "0"s on a continual basis and therefore the pieces of data included in the bit plane are not required to be transformed into different codes.

According to JPEG2000 (Joint Photographers Expert Group 2000) entropy coding, for example, only the numbers of bit planes prior to (or having bits more significant than those of) the bit plane in which "1" appears first while scanning the data relative to the planes in an order shown in FIG. 2, are recorded as "0-bit planes" in the header part of an output file. In the body of the file, the bit data in the bit plane in which "1" appears first and in the bit planes posterior to (or having bits less significant than those of) the bit plane are coded and stored.

Therefore, if there is an image that consists of only two pixels "a" and "b" shown in FIG. 2, only the numbers of the bit planes 7 to 5 in upper layer parts filled with "0"s are written in the header of the file. It suffices to know that all the so-called upper bit planes are filled with "0"s, while "0" continues, and therefore it is unnecessary to code the data itself by the circuit. Nevertheless, according to the conventional art, these pieces of data are all supplied to the circuit without making any discrimination, which disadvantageously takes excessively long processing time.

Further, it is normal to perform image processing for each pixel such as wavelet transform and quantization before the image processing for each bit plane is performed. It is noted that processing time required for the former pixel-basis processing corresponds to time for X*Y pixels, while processing time required for the latter bit plane-basis processing corresponds to time for X*Y*Z-bit planes. Generally, the latter processing time is longer than the former processing time, which causes the data to accumulate between the front circuit and the rear circuit, because the data subjected to the former processing is prevented from being entered to the latter processing. This disadvantageously deteriorates efficiency of the overall processing.

SUMMARY OF THE INVENTION

The present invention has been achieved in order to solve the above problems. It is an object of this invention to provide an image processing method, an image processing program, and an image processing apparatus that can reduce time and power necessary for processing by processing only necessary data.

According to one aspect of this invention, bit data is coded for each of bit planes that constitute an electronic image. A bit plane is specified from relevant bit planes among the bit planes, the relevant bit planes having plural pieces of bit data. The bit plane has the greatest bit plane number among bit planes having one piece of bit data having predetermined value. Plural pieces of bit data that constitute bit planes whose numbers are equal to or smaller than the bit plane number of the specified bit plane are extracted as effective data among the bit planes that constitute the electronic image. The extracted bit data is coded for each of the bit planes.

According to another aspect of this invention, bit data is coded for each of bit planes that constitute an electronic image. Plural pieces of bit data that represent one pixel of the electronic image are extracted, and bit data that has a predetermined value and has the greatest bit plane number of the pieces of bit data having the predetermined value is specified, among the extracted data. It is then determined whether the bit plane number of the specified bit data is greater than a bit plane number stored in a predetermined storage circuit or storage region. The bit plane number stored in the predetermined storage circuit or storage region is rewritten to the bit plane number of the specified bit data if it is determined that the bit plane number of the specified bit data is greater than the bit plane number stored in the predetermined storage circuit or storage region.

Furthermore, the predetermined storage circuit or storage region is initialized. Among the plural pieces of bit data for at least one pixel extracted with the greatest bit plane number of the pieces of bit data having the predetermined value stored in the predetermined storage circuit or storage region after the predetermined storage circuit or storage region is initialized, plural pieces of bit data for bit planes whose bit plane numbers are equal to or smaller than the bit plane number currently stored in the predetermined storage circuit or storage region may be extracted. Further, the extracted bit data may be coded for each of the bit planes.

According to the above aspects, any bit plane basically not required to be processed, e.g., a bit plane composed of, for example, only a single value is rounded down in advance before various bit plane-basis image processings such as coding are performed.

These and other objects, features and advantages of the present invention are specifically set forth in or will become apparent from the following detailed descriptions of the invention when read in conjunction with the accompanying drawings.

DETAILED DESCRIPTION

An embodiment of the image processing method, the image processing program, and the image processing apparatus according to the present invention will be explained in detail below with reference to the accompanying drawings.

Figure 3:
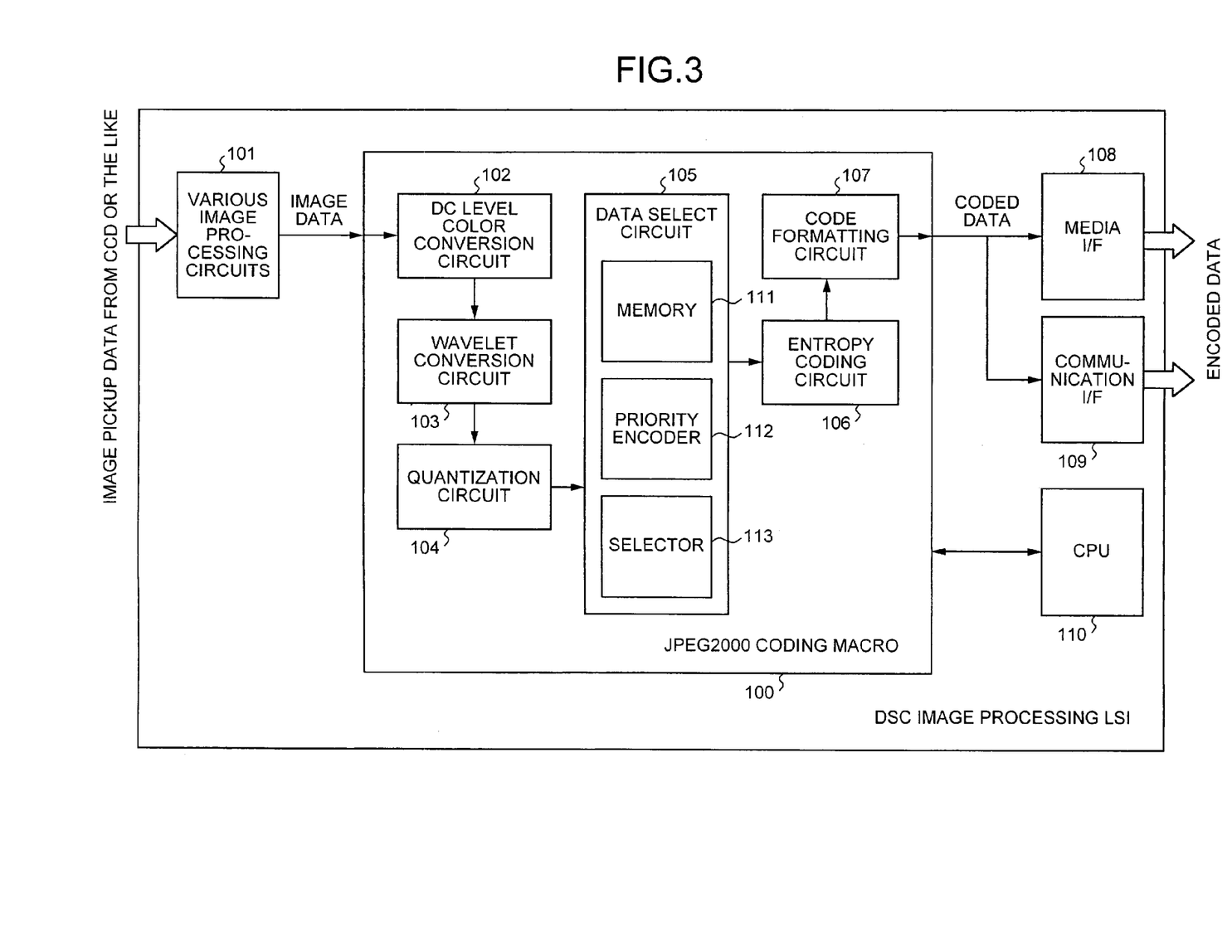
FIG. 3 shows a block diagram of the schematic configuration of an LSI for DSC image processing to be incorporated into an image processing apparatus according to an embodiment of the present invention.

FIG. 3 shows a block diagram of the schematic configuration of an LSI for digital still camera (DSC) image processing to be incorporated into the image processing apparatus (such as a digital camera) according to the embodiment of the present invention. As shown in FIG. 3, image pickup data input through a charge coupled device (CCD) or the like is input into a JPEG2000 coding macro 100 through various image processing circuits 101 that perform processings including brightness adjustment and edge enhancement.

The JPEG2000 coding macro 100 is a circuit dedicated to compression of image data into a format according to JPEG2000. In the JPEG2000 coding macro 100, the input image data is subjected to DC-level color conversion by a DC level color conversion circuit 102, to wavelet conversion by a wavelet conversion circuit 103, to quantization by a quantization processing circuit 104, and to entropy coding by an entropy coding circuit 106. Thereafter, the resultant data is subjected to code formatting by a code formatting circuit 107, and is output in the form of a JPEG format to a media I/F 108 and a communication I/F 109. A CPU 110 controls the operation of the JPEG2000 coding macro 100.

It is noted that the JPEG2000 coding macro 100 of the embodiment is additionally provided with a data select circuit 105 that includes a memory 111, a priority encoder 112, and a selector 113. This mechanism is characterized in that any data not required for entropy coding by the entropy coding circuit 106 can be cut in advance. This mechanism will be explained in more detail later.

Figure 4:
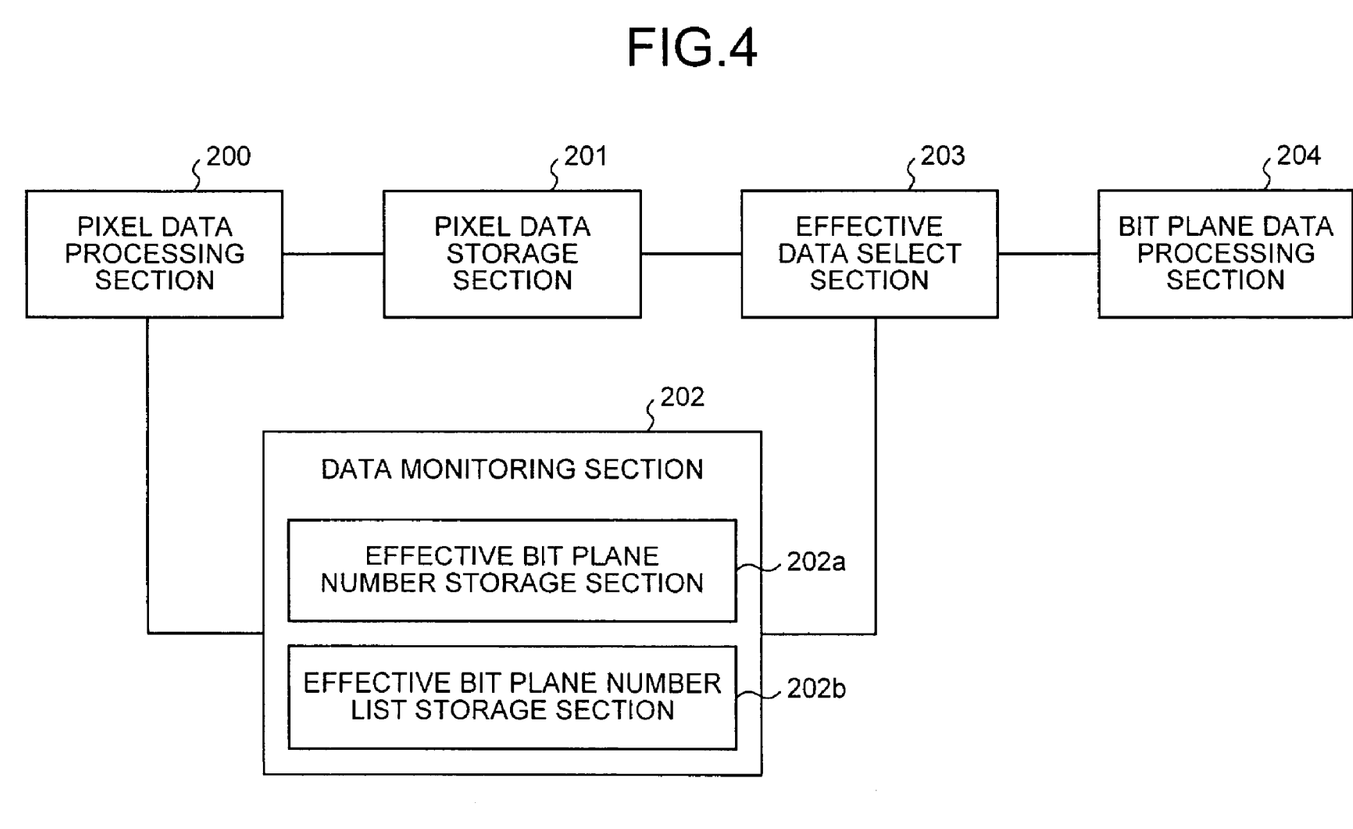
FIG. 4 shows a functional block diagram of the configuration of the image processing apparatus according to the embodiment.

FIG. 4 shows a functional block diagram of the configuration of the image processing apparatus according to the embodiment. Among various functions of the image processing apparatus, only some functions, i.e., functions from quantization to entropy coding realized by the macro will be explained herein. As shown in FIG. 4, the image processing apparatus in this embodiment includes a pixel data processing section 200, a pixel data storage section 201, a data monitoring section 202, an effective data select section 203, and a bit plane data processing section 204.

The pixel data processing section 200 is a functional section that conducts a pixel-basis image processing to an electronic image the structure of which is shown in FIG. 1. That is, the pixel data processing section 200 conducts so-called longitudinal processing to the image by regarding a plurality of pieces of bit data constituting each pixel as one numeric value. The pixel data processing section 200 in this embodiment is assumed to perform quantization that is one of the pixel-basis image processings. Since the procedure of quantization is well known, detailed explanation thereof is omitted herein.

The pixel data storage section 201 is a functional section that temporarily stores the pixel data output from the pixel data processing section 200, and is realized by the memory 111 shown in FIG. 3. The storage capacity of the section 201 is required so as to allow at least data for the pixels in one block specified according to JPEG2000 to be stored.

In the JPEG2000 coding scheme, quantized image data (processed data is used as a coefficient) is divided into blocks and the blocks are subjected to coding (entropy). The images of the divided blocks, i.e., the partial images of the original image will be explained herein as respective electronic images. Therefore, it suffices that the pixel data storage section 201 can hold image data for at least one electronic image, but the section 201 is assumed to have a capacity large enough to hold a plurality of electronic images.

The data monitoring section 202 refers to the pixel data output from the image data processing section 200, and writes the greatest bit plane number (or "bit number") among pieces of bit data that have a value "1" in the pixel data, in an effective bit plane number storage section 202a. However, the bit plane number is written only if the value to be written exceeds the value already written in the effective bit plane number storage section 202a.

Figure 5A:
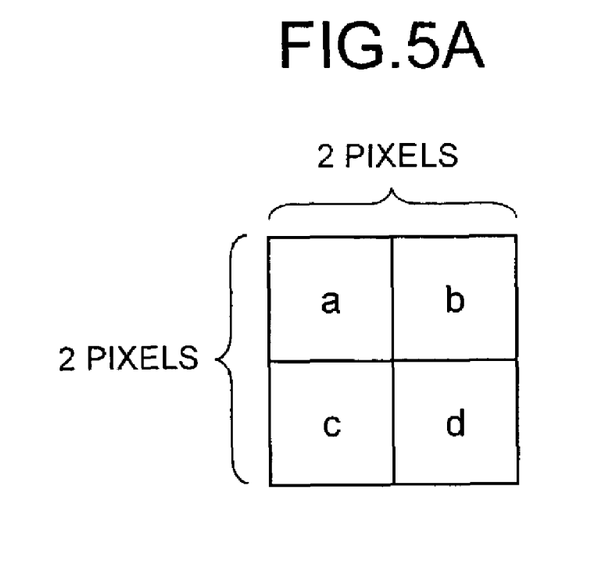
FIG. 5A and FIG. 5B show a processing order of subjecting respective pieces of pixel data to quantization by the image processing apparatus according to the embodiment.
Figure 5B:
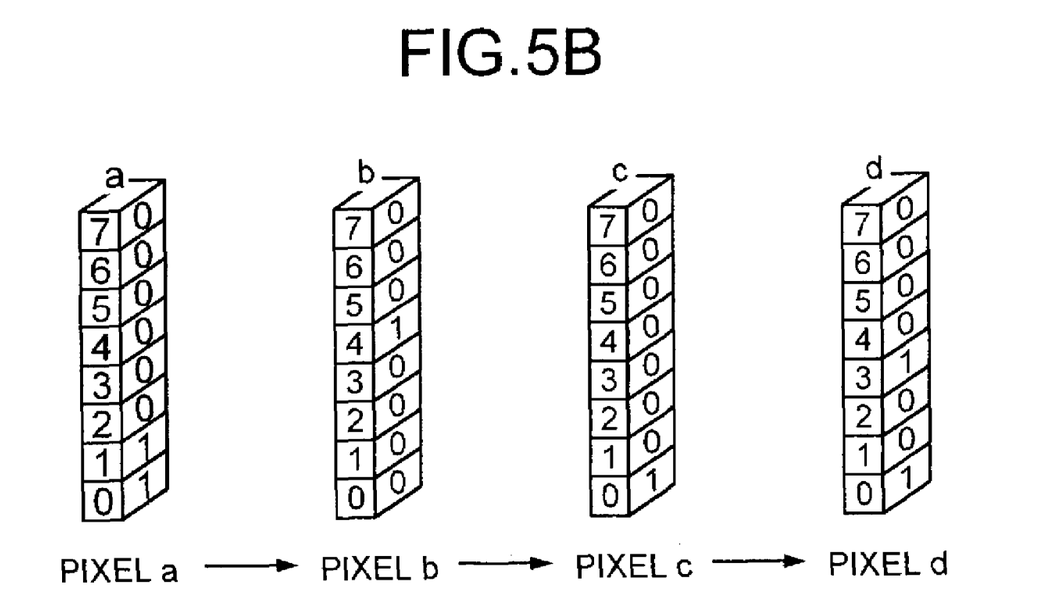

The operation of this data monitoring section 202 will be explained below while referring to a concrete example. If one block consists of 2 pixels×2 pixels or a total of 4 pixels as shown in FIG. 5A, pieces of data for the respective pixels are fed to the data monitoring section 202 in order of "a" to "b" to "c" to "d" after being quantized by the pixel data processing section 200 as shown in FIG. 5B.

The data monitoring section 202 refers to the pieces of pixel data for each of the pixels input from the pixel data processing section 200, e.g., data for the pixel "a", and detects the most significant bit that has a value "1". Note that the pixel data for the input individual pixels can be also referred to as "pixel-data stored in the pixel data storage section 201" since they are also simultaneously output to the pixel data storage section 201. In the data for the pixel "a" shown in FIG. 5B, the bit planes 0 and 1 include a value of "1", and "1" of the bit plane 1 is more significant than that of the bit plane 0.

The effective bit plane number storage section 202a is cleared when the formation of blocks starts, and a value "1" to be written in the storage section 202a is unconditionally considered to exceed the value already written therein (although no "value already written" actually exists). Therefore, the data monitoring section 202 writes "1" in the storage section 202a.

The data monitoring section 202 then refers to the data for the pixel "b". Only the bit plane 4 includes "1" and therefore the bit plane 4 is the most significant bit plane. A value "4" to be written exceeds the value "1" already written in the effective bit plane number storage section 202a. Therefore, the data monitoring section 202 rewrites the value "1" in the storage section 202a to "4".

The data monitoring section 202 refers to the data for the pixel c. Only the bit plane 0 includes "1" and therefore the bit plane 0 is the most significant bit plane. Since a value "0" to be written does not exceed the value "4" already written in the effective bit plane number storage section 202a, the data monitoring section 202 stops writing the value "0" in the storage section 202a and proceeds the processing to step of determining the next pixel d.

The data monitoring section 202 refers to the data for the pixel d. The bit planes 0 and 3 include "1" and therefore the bit plane 3 is the most significant bit plane. Since a value "3" to be written does not exceeds the value "4" already written, the value of the effective bit plane number storage section 202a is not updated.

Accordingly, when the pieces of pixel data for one block are stored in the pixel data storage section 201, the effective bit number storage section 202a holds the value "4". This value indicates that all the bit planes more significant than the bit plane 4 of the block, i.e., the bit planes 5, 6, and 7 are all 0-bit planes.

Upon finishing the processing to the pixel data for one block, the data monitoring section 202 stores the block number of this block in an effective bit plane number list storage section 202b while making the block number correspond to the value, i.e., "4" in the example of FIG. 5B, stored in the effective bit plane number storage section 202a at the time the processing of the block is complete.

Among the pieces of bit data that constitute the respective pixels of the block, those belonging to the bit planes more significant than the bit plane 4 are all cut by the effective data select section 203 provided upstream of the bit plane data processing section 204 to be explained later before being fed to the bit plane data processing section 204. Therefore, it can also be said that the series of processings performed by the data monitoring section 202 is an operation that specifies effective bit data as a processing target of the bit plane data processing section 204 for each block.

This data monitoring section 202 is specifically realized by the priority encoder 112 that determines which of the bits shown in FIG. 3, is greater, and a storage circuit that stores a processing result.

Figure 6:
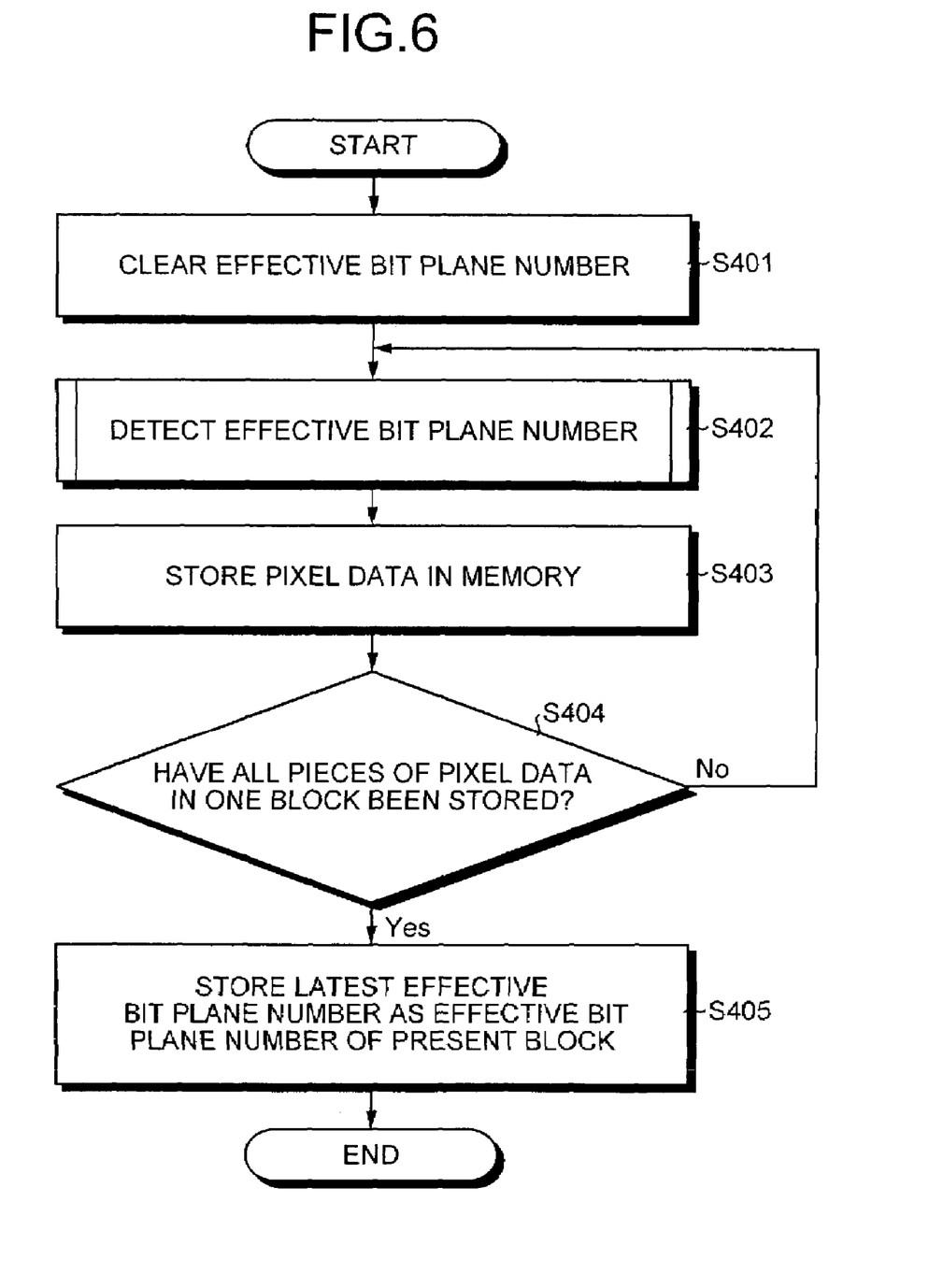
FIG. 6 shows a flow chart of procedure of processing performed by a data monitoring section 202 according to the embodiment.

FIG. 6 is a flow chart of procedure for the processing performed by the data monitoring section 202. Before starting processing a new block, the data monitoring section 202 initializes effective bit plane number storage section 202a (step S401). The data monitoring section 202 monitors pieces of pixel data sequentially supplied from the pixel data processing section 200, and detects a bit plane number of the most significant bit plane among those including "1" in the pixel data for one block (step S402).

Figure 7:
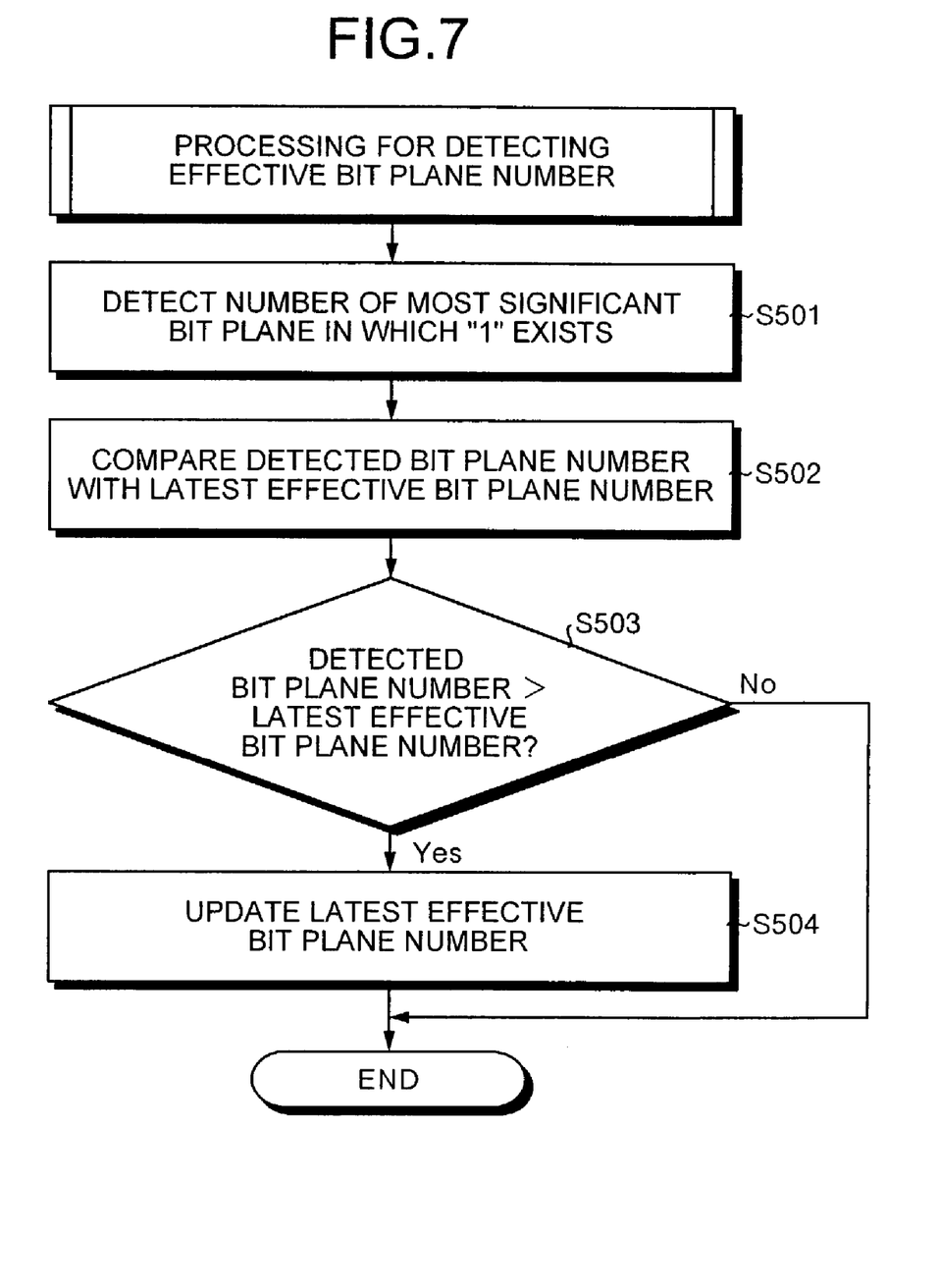
FIG. 7 shows a flow chart of procedure of processing for detecting an effective bit plane number executed at step S402 shown in FIG. 6.

FIG. 7 is a flow chart of procedure for detecting an effective bit plane number at step S402 of FIG. 6. The data monitoring section 202 refers to a plurality of pieces of bit data that represent one pixel to detect a bit plane number of the most significant bit plane among the bit planes including "1" (step S501).

The data monitoring section 202 then compares the bit plane number detected at step S501 with the latest effective bit plane number held in the effective bit plane number storage section 202a at that time (step S502). If the former bit plane number is greater than the latter (step S503: Yes), the data monitoring section 202 updates the value stored in the effective bit plane number storage section 202a to the bit plane number detected at step S501 (step S504).

Referring again to FIG. 6, the pixel data storage section 201 to which the same pixel data is supplied in parallel with the data monitoring section 202, fetches and stores the data (step S403). The pixel data storage section 201 repeatedly executes the processings at steps S402 and S403 for all pieces of pixel data in one block. When the pixel data storage section 201 finishes storing up to the last pixel data of one block in the pixel data storage section 201 (step S404: Yes), the pixel data storage section 201 stores the value held in the effective bit plane number storage section 202a, in the effective bit plane number list storage section 202b while making the value correspond to the block number (step S405).

Referring again to FIG. 4, the effective data select section 203 is a functional section that selects only the data to be processed by the bit plane data processing section 204 to be explained later, i.e., selects only the effective data as processing target pixel data, among the pixel data read from the pixel data storage section 201.

The value "4" stored in the effective bit plane number list storage section 202b in correlation with the block shown in FIG. 5B indicates the bit plane number of the most significant bit plane that includes "1", of the pixels "a" to "d" in the block, or the bit plane number of the most significant bit plane of the pixel "b".

As can be seen from FIG. 5B, all the bit plane 5 and the bit planes more significant than the bit plane 5 include "0", respectively. It suffices to record that these planes include only "0" without the need to convert (encode) the continuous "0" bits to another numerical value string. Therefore, this effective data select section 203 extracts only the bit plane 4 and the less significant bit planes in the block as a preprocessing to the coding performed by the bit plane data processing section 204. It is noted that the effective data select section 203 is specifically realized by the selector 113 shown in FIG. 3.

Figure 8:
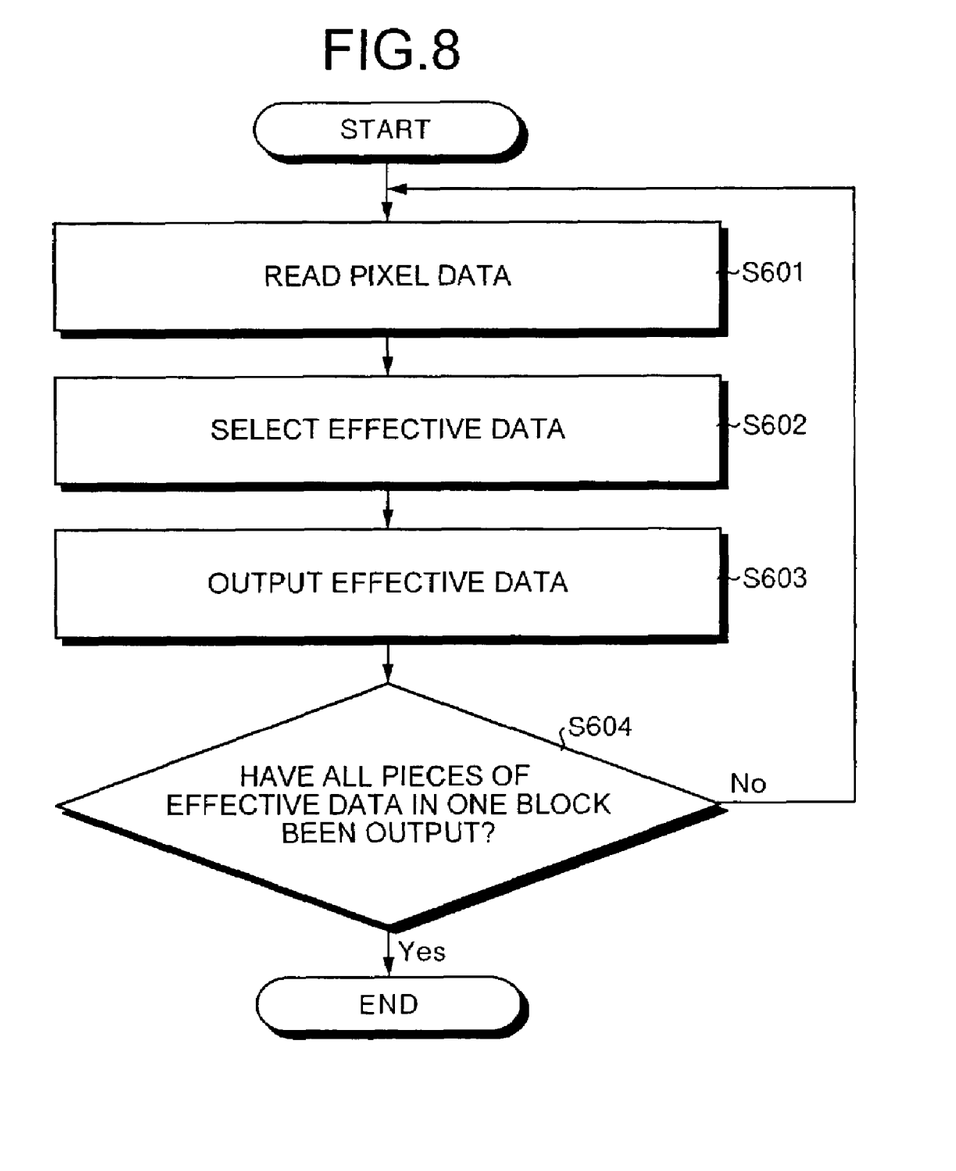
FIG. 8 shows a flow chart of procedure of processing by an effective data select section 203 according to the embodiment.

FIG. 8 is a flow chart of procedure for the processing performed by the effective data select section 203. The effective data select section 203 reads bit data for one pixel from the pixel data storage section 201 (step S601), and selects only the bit planes less significant than the effective bit plane specified for the block to which the pixel belongs (step S602). The effective data select section 203 feeds the selected data to the bit plane data processing section 204 (step S603). The effective data select section 203 performs this processing on all the pixels in one block. Upon finishing processing the one block (step S604: Yes), the effective data select section 203 finishes the processing procedure.

Referring back to FIG. 4, the bit plane data processing section 204 is a functional section that performs bit plane-basis image processing on the pixel data selected by the effective data select section 203 or performs so-called lateral processing on the image by setting the bit data for the respective pixels located in the same plane as a group. It is noted that the bit plane data processing section 204 in this embodiment carries out entropy coding which is one of the bit plane-basis image processings. Since the procedure for the entropy coding is well known, detailed explanation thereof will be omitted herein.

Figure 9:
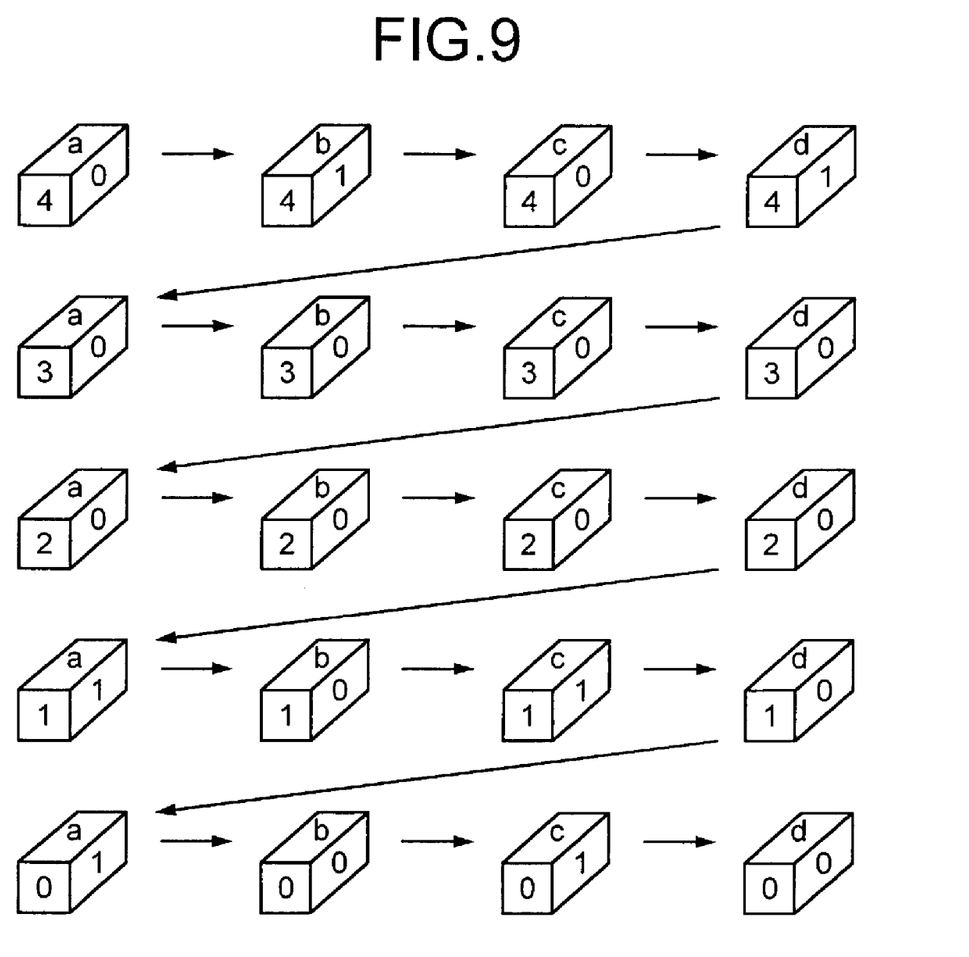
FIG. 9 shows a processing order of subjecting respective bit data to entropy coding by the image processing apparatus according to the embodiment.

The coding by the bit plane data processing section 204 is carried out to the bit planes that include at least one "1", that is, to the bit plane 4 and the bit planes less significant than the bit plane 4 in the example of FIG. 5B. This is because the effective data select section 203 cuts unnecessary bit planes in advance. In other words, as shown in FIG. 9, the bit plane data processing section 204 skips processings from a7 to d5 unlike the conventional art, and starts coding from a4.

According to the embodiment explained above, the data of the bit planes for which the entropy coding based on JPEG2000 can be omitted or the data of the bit planes on the upper layer on which "0" bits are continuous, are not output to the coding circuit. Therefore, if there are n bit planes for which the entropy coding can be omitted, the time required for coding can be reduced from the time corresponding to X*Y*Z bit planes that is required by the conventional art to the time corresponding to X*Y* (Z−n) bit planes. Power required for the processings can be reduced, accordingly.

In addition, the difference between the time required to quantize the data for the respective pixels and the time required to subject the data to entropy coding for the respective bit planes can be narrowed. As a result, the quantity of data that is stuck between the two processings can be reduced. Therefore, it is possible to prevent a certain part of the circuit from becoming a bottleneck and deteriorating efficiency of the entire processings.

The entropy coding according to JPEG2000 has been explained in the embodiment. However, if there are bit plane-basis processings wastefully performed even to the unnecessary bit planes, processing efficiency can be improved by applying the present invention.

Moreover, while the respective functional sections are realized by dedicated hardware (such as the priority encoder) in the embodiment, the respective functional sections may be realized by incorporating dedicated programs into a programmable processor.

For example, the respective functional sections may be realized by ordinary application software such as photoretouching software. That is, modules as follows and so on are created: (1) a module (corresponding to the data monitoring section 202) that holds the most significant bit having "1" of each pixel data as a predetermined variable when pieces of the quantized pixel data are sequentially stored in a predetermined memory region; and (2) a module (corresponding to the effective data select section 203) that selects only the data for the bit planes equal to or smaller than the variable when the pixel data corresponding to one block is fetched from the memory. These modules are stored in a hard disk or the like of a computer.

The recording medium that records these programs is not limited to the hard disk but any other computer readable recording mediums such as a flexible disk, a ROM (Read Only Memory), a CD-ROM (Compact Disc Read Only Memory), a CD-RW (Compact Disc ReWritable), an MO (Magneto-optic disc), and a DVD (Digital Versatile Disc) can be used to record the programs and to distribute the programs. Further, the programs can be distributed over a network such as the Internet.

As explained so far, according to the present invention, bit planes basically not required to be processed, e.g., bit planes composed of only a single value are rounded down in advance before various bit plane-basis image processings such as coding are performed. Therefore, the present invention exhibits an advantage of obtaining an image processing method, an image processing program, and an image processing apparatus that can reduce the time and power required for processings by processing only the necessary data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing method of coding bit data for each of bit planes that constitute an electronic image, the method comprising the steps of:

specifying a bit plane from relevant bit planes among the bit planes, the relevant bit planes having plural pieces of bit data, the bit plane having the greatest bit plane number among bit planes having one piece of bit data having predetermined value;

extracting plural pieces of bit data, as effective data, that constitute bit planes whose numbers are equal to or smaller than the bit plane number of the specified bit plane among the bit planes that constitute the electronic image; and coding the extracted bit data for each of the bit planes.

2. An image processing method of coding bit data for each of bit planes that constitute an electronic image, the method comprising the steps of:

extracting plural pieces of bit data that represent one pixel of the electronic image, as pixel data;

specifying bit data that has a predetermined value and has the greatest bit plane number of the pieces of bit data having the predetermined value, among the extracted bit data; determining whether the bit plane number of the specified bit data is greater than a bit plane number stored in a predetermined storage circuit or storage region; and rewriting the bit plane number stored in the predetermined storage circuit or storage region to the bit plane number of the specified bit data if it is determined that the bit plane number of the specified bit data is greater than the bit plane number stored in the predetermined storage circuit or storage region.

3. The image processing method according to claim 2, further comprising the steps of:

initializing the predetermined storage circuit or storage region; and among the plural pieces of bit data for at least one pixel extracted at the step of extracting the pixel data with the greatest bit plane number of the pieces of bit data having the predetermined value stored in the predetermined storage circuit or storage region after the predetermined storage circuit or storage region is initialized at the initializing step, extracting bit data, as effective data, for bit planes whose bit plane numbers are equal to or smaller than the bit plane number currently stored in the predetermined storage circuit or storage region.

4. The image processing method according to claim 3, further comprising a step of coding the bit data extracted at the step of extracting the effective data, for each of the bit planes.

5. A computer-readable storage for controlling a computer comprising an image processing program for coding bit data for each of bit planes that constitute an electronic image, the program allowing a computer to execute:
  specifying a bit plane from relevant bit planes among the bit planes, the relevant bit planes having plural pieces of bit data, the bit plane having the greatest bit plane number among bit planes having one piece of bit data having predetermined value;
  extracting plural pieces of bit data, as effective data, that constitute bit planes whose numbers are equal to or smaller than the bit plane number of the specified bit plane among the bit planes that constitute the electronic image; and
  coding the extracted bit data for each of the bit planes.

6. A computer-readable storage for controlling a computer comprising an image processing program for coding bit data for each of bit planes that constitute an electronic image, the image processing program allowing a computer to execute:
  extracting plural pieces of bit data that represent one pixel of the electronic image, as pixel data;
  specifying bit data that has a predetermined value and has the greatest bit plane number of the pieces of bit data having the predetermined value, among the extracted bit data;
  determining whether the bit plane number of the specified bit data is greater than a bit plane number stored in a predetermined storage circuit or storage region; and
  rewriting the bit plane number stored in the predetermined storage circuit or storage region to the bit plane number of the specified bit data if it is determined that the bit plane number of the specified bit data is greater than the bit plane number stored in the predetermined storage circuit or storage region.

7. The image processing program according to claim 6, allowing a computer to further execute the steps of:
  initializing the predetermined storage circuit or storage region; and
  among the plural pieces of bit data for at least one pixel extracted at the step of extracting the pixel data with the greatest bit plane number of the pieces of bit data having the predetermined value stored in the predetermined storage circuit or storage region after the predetermined storage circuit or storage region is initialized at the initializing step,
  extracting plural pieces of bit data, as effective data, for bit planes whose bit plane numbers are equal to or smaller than the bit plane number currently stored in the predetermined storage circuit or storage region.

8. The image processing program according to claim 7, allowing a computer to further execute a step of coding the bit data extracted at the step of extracting the effective data, for each of the bit planes.

9. An image processing apparatus that codes bit data for each of bit planes that constitute an electronic image, the apparatus comprising:
  a specification unit that specifies a bit plane from relevant bit planes among the bit planes, the relevant bit planes having plural pieces of bit data, the bit plane having the greatest bit plane number among bit planes having one piece of bit data having predetermined value;
  an effective data extraction unit that extracts plural pieces of bit data that constitute bit planes whose bit plane numbers are equal to or smaller than the bit plane number of the specified bit plane among the bit planes that constitute the electronic image; and
  a coding unit that codes the bit data extracted by the effective data extraction unit for each of the bit planes.

10. An image processing apparatus that codes bit data for each of bit planes that constitute an electronic image, the apparatus comprising:
  a pixel data extraction unit that extracts plural pieces of bit data that represent one pixel of the electronic image;
  a specification unit that specifies bit data that has a predetermined value and has the greater bit plane number of the pieces of bit data having the predetermined value, among the bit data extracted by the pixel data extraction unit
  a determination unit that determines whether the bit plane number of the bit data specified by the specification unit is greater than a bit plane number stored in a predetermined storage circuit or storage region; and
  a rewrite unit that rewrites the bit plane number stored in the predetermined storage circuit or storage region to the bit plane number of the bit data specified by the specification unit if it is determined by the determination unit that the bit plane number of the specified bit data is greater than the bit plane number stored in the predetermined storage circuit or storage region.

11. The image processing apparatus according to claim 10, further comprising:
  an initialization unit that initializes the predetermined storage circuit or storage region; and
  among the plural pieces of bit data for at least one pixel extracted by the pixel data extraction unit with the greatest bit plane number of the pieces of bit data having the predetermined value stored in the predetermined storage circuit or storage region after the predetermined storage circuit or storage region is initialized by the initialization unit,
  an effective data extraction unit that extracts plural pieces of bit data for bit planes whose bit plane numbers are equal to or smaller than the bit plane number currently stored in the predetermined storage circuit or storage region.

12. The image processing apparatus according to claim 11, further comprising a coding unit that codes the bit data extracted by the effective data extraction unit, for each of the bit planes.

13. The image processing apparatus according to claim 11, wherein the effective data extraction unit is realized by a selector.

14. The image processing apparatus according to claim 10, wherein the specification unit is realized by a priority encoder.

* * * * *